US012773702B2

(12) United States Patent
Cholst et al.

(10) Patent No.: US 12,773,702 B2
(45) Date of Patent: Oct. 27, 2026

(54) CONTACTLESS MACHINE DRIVE AND HAND TOOL

(71) Applicant: Milwaukee Electric Tool Corporation, Brookfield, WI (US)

(72) Inventors: Beth E. Cholst, Wauwatosa, WI (US); Jonathan S. Keller, Menomonee Falls, WI (US); Luis F. Gonzalez Jauregui, Milwaukee, WI (US); Jeffrey C. Hessenberger, Neosho, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 253 days.

(21) Appl. No.: 18/335,599

(22) Filed: Jun. 15, 2023

(65) Prior Publication Data

US 2023/0415180 A1 Dec. 28, 2023

Related U.S. Application Data

(60) Provisional application No. 63/354,965, filed on Jun. 23, 2022.

(51) Int. Cl.
*B05B 9/08* (2006.01)
*F04B 17/03* (2006.01)
(Continued)

(52) U.S. Cl.
CPC ............ *B05B 9/0861* (2013.01); *F04B 17/03* (2013.01); *F04B 17/06* (2013.01); *F04D 13/024* (2013.01); *F04D 13/16* (2013.01); *H02K 7/145* (2013.01); *B05B 9/0888* (2013.01); *F04B 23/023* (2013.01); *F04B 23/026* (2013.01);
(Continued)

(58) Field of Classification Search
CPC ..... B05B 9/0861; B05B 9/0888; F04B 17/03; F04B 17/06; F04B 23/023; F04B 23/026; F04D 13/024; F04D 13/16; F04D 13/06; F04D 13/0666; F04D 13/0693;
(Continued)

(56) References Cited

U.S. PATENT DOCUMENTS 3,299,819 A * 1/1967 Mccoy ................ H02K 49/108 310/104
4,187,959 A 2/1980 Pelton
(Continued)

FOREIGN PATENT DOCUMENTS

WO WO2014036006 A2 3/2014

OTHER PUBLICATIONS

European Search Report Corresponding with Application No. EP23179270 on Nov. 10, 2023 (2 pages).
(Continued)

*Primary Examiner* — David N Brandt
(74) *Attorney, Agent, or Firm* — Dority & Manning, P.A.

(57) ABSTRACT

A machine drive system is provided including a wall forming a first side fluidly separated from a second side and a machine drive device disposed at the second side. The machine drive device includes a receiver device in which a second gap is formed between the receiver device and the wall at the second side. A drive device is positioned at the first side in electromagnetically proximate arrangement to the machine drive device. A first gap is formed between at least a portion of the drive device and the wall.

13 Claims, 7 Drawing Sheets

(51) Int. Cl.

| | |
|---|---|
| ***F04B 17/06*** | (2006.01) |
| ***F04B 23/02*** | (2006.01) |
| ***F04D 13/02*** | (2006.01) |
| ***F04D 13/06*** | (2006.01) |
| ***F04D 13/16*** | (2006.01) |
| ***H02J 50/10*** | (2016.01) |
| ***H02K 7/14*** | (2006.01) |
| ***H02K 49/10*** | (2006.01) |

(52) U.S. Cl.
CPC ...... *F04D 13/0666* (2013.01); *F04D 13/0693* (2013.01); *H02J 50/10* (2016.02); *H02K 49/108* (2013.01)

(58) Field of Classification Search
CPC .. F04D 13/0606; H02K 7/145; H02K 49/108; H02K 5/1282; H02J 50/10; H02J 50/005
See application file for complete search history.

(56) References Cited

U.S. PATENT DOCUMENTS

| | | | | |
|---|---|---|---|---|
| 7,313,840 | B2 * | 1/2008 | Watkins | F04D 13/027 15/103 |
| 2004/0217137 | A1 * | 11/2004 | Ophardt | A47K 5/122 222/481.5 |
| 2006/0210412 | A1 * | 9/2006 | Lawyer | F04D 13/027 417/420 |
| 2016/0146219 | A1 * | 5/2016 | Lyon | F04D 29/5806 417/366 |
| 2017/0098991 | A1 | 4/2017 | Takahashi et al. | |
| 2017/0348655 | A1 | 12/2017 | Adams | |

OTHER PUBLICATIONS

European Office Action Corresponding to Application No. 23179270.6 on Jun. 20, 2025.

* cited by examiner

CONTACTLESS MACHINE DRIVE AND HAND TOOL

PRIORITY STATEMENT

The present application claims the benefit of priority to U.S. Provisional Patent Application Ser. No. 63/354,965, filed on Jun. 23, 2022, the disclosure of which is incorporated by reference in its entirety.

FIELD

The present disclosure relates generally to hand-held power equipment and machine drive systems, such as for power tools, pumps, or compressors.

BACKGROUND

Users of hand tools, such as portable sprayers, would benefit from longer usage and action and less interruption when performing tasks. However, users may be interrupted by requiring re-filling of fluids into a tank. Additionally, when tanks run empty of the fluid, a pump may cavitate, which may cause damage to the pump.

Improved pumps, compressors, or flow devices for hand tools are desired in the art. Furthermore, improved hand tools are desired in the art.

BRIEF DESCRIPTION

Aspects and advantages of the invention in accordance with the present disclosure will be set forth in part in the following description, or may be obvious from the description, or may be learned through practice of the technology.

An aspect of the present disclosure is directed to a machine drive system including a wall forming a first side fluidly separated from a second side and a machine drive device disposed at the second side. The machine drive device includes a receiver device in which a second gap is formed between the receiver device and the wall at the second side. A drive device is positioned at the first side in electromagnetically proximate arrangement to the machine drive device. A first gap is formed between at least a portion of the drive device and the wall.

Another aspect of the present disclosure is directed to a hand tool including a tank configured to receive a solid, liquid, gaseous, or combination thereof medium. The tank includes a first tank portion selectively separable from a second tank portion.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

Figure 1:
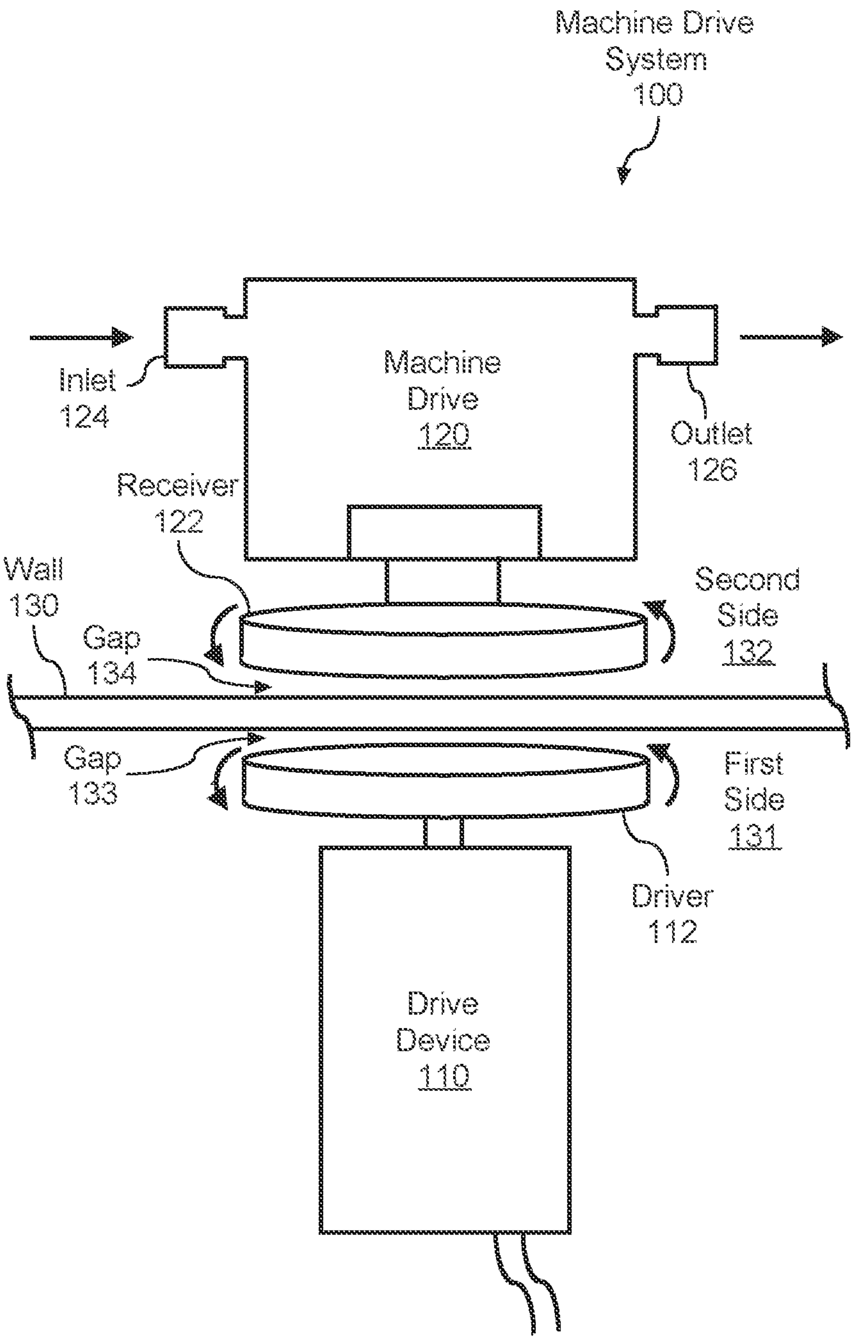
FIG. 1 is a schematic view of an exemplary embodiment of a machine drive system in accordance with aspects of the present disclosure.

Repeat use of reference characters in the present specification and drawings is intended to represent the same or analogous features or elements of the present invention.

DETAILED DESCRIPTION

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Terms of approximation, such as “about,” “generally,” “approximately,” or “substantially,” include values within ten percent greater or less than the stated value. When used in the context of an angle or direction, such terms include within ten degrees greater or less than the stated angle or direction. For example, “generally vertical” includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

Embodiments of a machine drive system are provided. Particular embodiments depicted and described herein include contactless or non-mechanical machine drive systems. Aspects of the disclosure provided herein may include hand tools, or hand-held machine drive devices, or hand-held power pump or compressor devices including embodiments of contactless or non-mechanical machine drive systems.

Certain embodiments of the machine system provided herein allow for positioning the machine system within a tank or reservoir at which a fluid resides. Particular embodiments of the machine system allow a pump, compressor, impeller, mechanical flow device, rotary device, or other machine device device to dispose or otherwise position within a tank, reservoir, or other walled manifold. Such embodiments may particularly allow for machine operation without mechanically penetrating or extending through walls, such as walls as may separate a drive motor and a pump, or separate a pump and a manifold.

Figure 2:
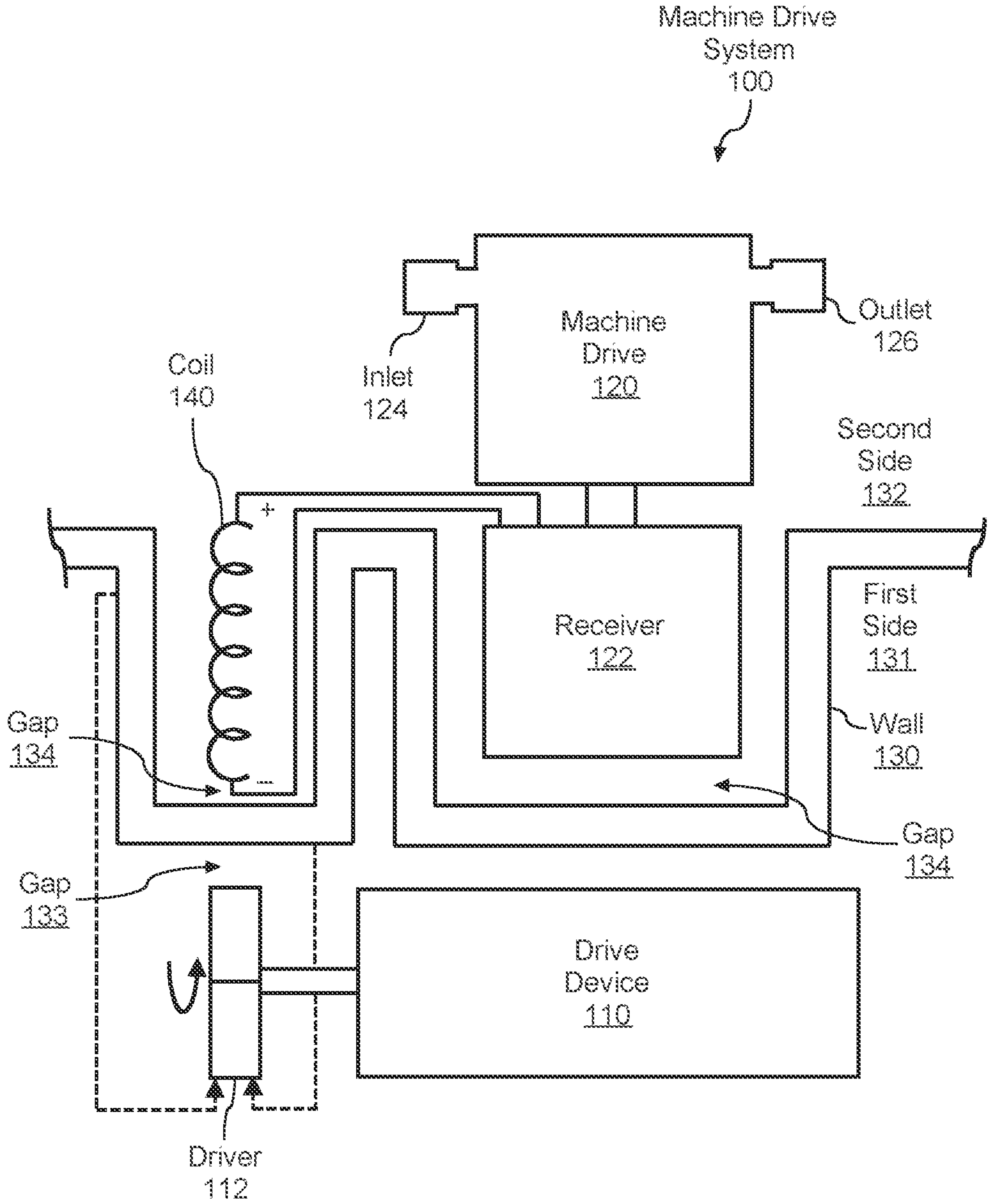
FIG. 2 is a schematic view of an exemplary embodiment of a machine drive system in accordance with aspects of the present disclosure.
Figure 3:
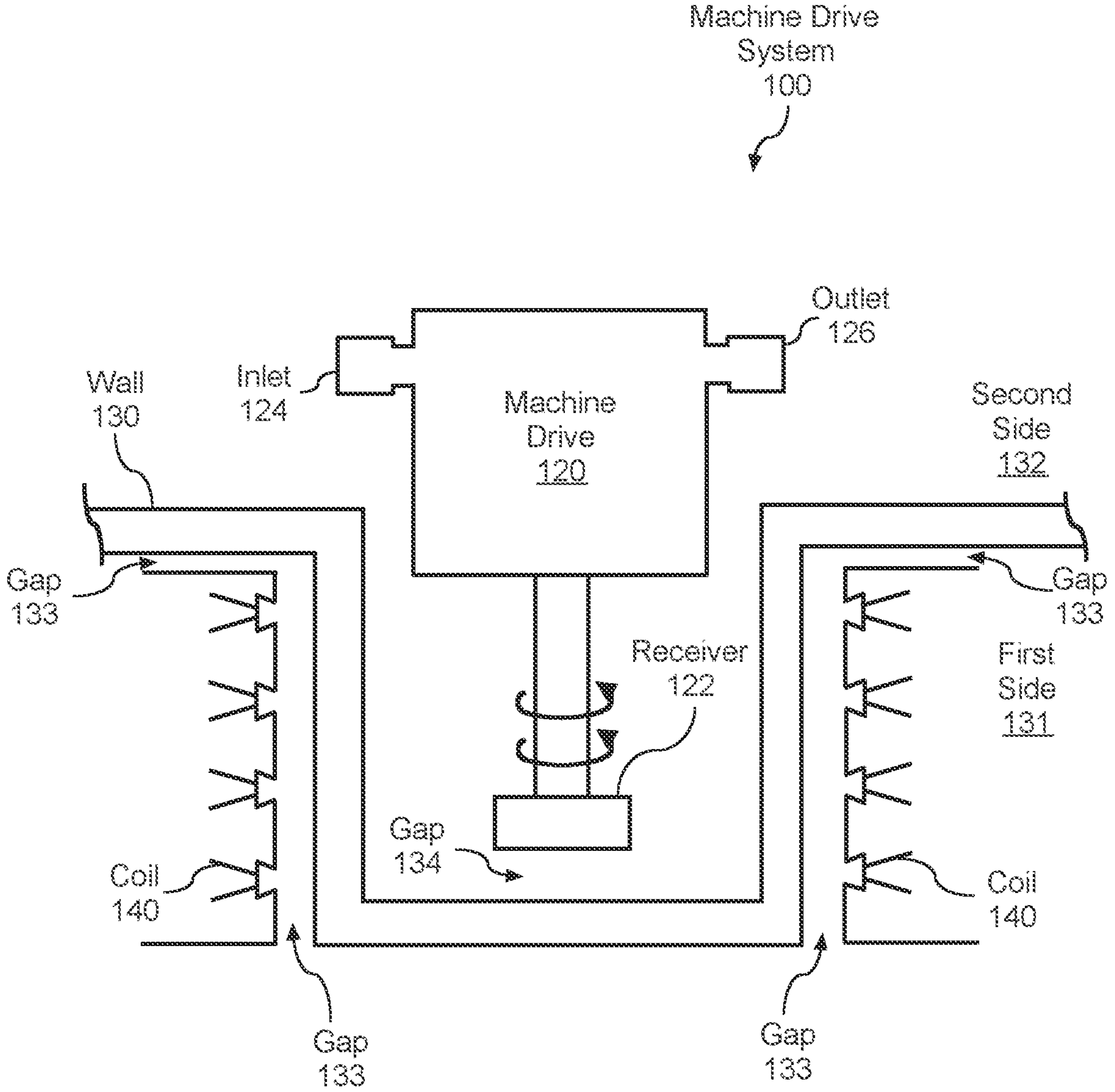
FIG. 3 is a schematic view of an exemplary embodiment of a machine drive system in accordance with aspects of the present disclosure.

Referring now to FIGS. 1-3, schematic embodiments of a machine drive system 100 is provided. System 100 may generally include a blocking medium, such as a wall 130. Wall 130 may form, at least in part, a tank, reservoir, manifold, or other structure separating a first side 131 and a second side 132. In a particular embodiment, wall 130 may fluidly separate the first side 131 from the second side 132. Accordingly, wall 130 may define the first side 131 as an exterior volume separated from an interior volume or plenum at the second side 132. In embodiments such as further described herein, wall 130 may include a tank, reservoir, manifold, or other structure configured to contain or retain a medium or fluid, such as a liquid, gel, plasma, gas, flowable solid (e.g., granules, sand, pellets, etc.), or combinations thereof.

System 100 includes a machine drive device 120 having a receiver device 122. Machine drive device 120 may include any desired pump, compressor, impeller, diaphragm, flow device, or rotary device. In the embodiments depicted in FIGS. 1-3, machine drive device 120 is configured as a flow device forming an inlet opening 124 and an outlet opening 126. Medium contained by wall 110 at the second side 122 may substantially surround the machine drive device 120, or particularly the inlet opening 124. Inlet opening 124 is configured to receive a flow of medium and flow, egress, eject, or otherwise provide the medium through outlet opening 126. In various embodiments, machine drive device 120 may be immersed or immersible within the medium at the second side 132. It should be appreciated that a manifold, conduit, hose, or tube may be attached or attachable to the inlet opening 124 or the outlet opening 126, such as to desirably receive or egress medium from the second side 132.

A receiver device 122 is rotatably coupled to the machine drive device 120. The receiver device 122 is positioned proximate to wall 130 and separated from wall 130 by gap 134 at the second side 132. Accordingly, receiver device 122 is in non-contacting relationship to the wall 130. Receiver device 122 is rotatable such as to drive or otherwise provide a power, torque, or other energy input to operate the machine drive device 120.

In one particular embodiment, receiver device 122 is a magnet configured to rotate based receiving an electromagnetic force. In another particular embodiment, receiver device 122 is a ferrous or ferromagnetic material (e.g., iron, steel, alloys thereof, or combinations thereof, etc.) configured to rotate based on receiving an electromagnetic force.

Referring to FIG. 1, embodiments of the system 100 include a drive device 110 positioned at the first side 131. Drive device 110 includes a driver device 112 rotatably coupled to the drive device 110. The driver device 112 may particularly include a magnet. Drive device 110 may include any appropriate electrical motor or mechanical motive device operably coupled to rotate or actuate the driver device 112. Magnetic fields formed by movement of the driver device 112 interact with the receiver device 122 to move the receiver device 122, such as configured as an opposite-polarity magnet relative to the driver device 112, or as a ferrous or ferromagnetic material. The driver device 112 is positioned proximate to wall 130 and separated from wall 130 by gap 133. In particular embodiment, receiver device 122 and driver device 112 are positioned in electromagnetically proximate arrangement relative to one another. Furthermore, wall 130 separates receiver device 122 and driver device 112. It should be appreciated that electromagnetically proximate arrangement is any appropriate area or dimension at which receiver device 122 and driver device 112 are separated from one another via wall 130 and respective gaps 133, 134. Still further, electromagnetically proximate arrangement includes any operable arrangement through which a magnetic field may pass through an area between the receiver device 122 and the driver device 112, such as to allow for the effect of a magnetic force to move the receiver device 122.

Referring now to FIGS. 2-3, certain embodiments of the system 100 include a coil 140 configured to drive the receiver device 122. The coil 140 may particularly form an induction coil. Referring to FIG. 2, coil 140 is positioned at the second side 132 and in electromagnetically proximate arrangement with driver device 112. Gap 134 separates coil 140 from wall 130 at the second side 132. Driver device 112 rotates or actuates to change the magnetic flux through coil 140. Change in magnetic flux through coil 140 induces a current at the coil 140. Voltage derived from the generated current drives the receiver device 122. In a particular embodiment, receiver device 122 is configured as a driven motor operably coupled to receive voltage from the coil 140 and drive the machine drive device 120.

Referring to FIG. 3, coil 140 is positioned at the first side 131 and in electromagnetically proximate arrangement with receiver device 122. Gap 133 separates coil 140 from wall 130 at the first side 131. A power input, such as, e.g., an alternating current (AC) power input, selectively provides current through coil 140. Receiver device 122 may particularly include a magnet, such as described above, and rotate a shaft at the machine drive device 120.

In various embodiments, coils, magnets, metals, etc. depicted and described herein may be configured as rotatable devices or linear devices to change magnetic flux and drive the receiver device 122.

In still various embodiments, wall 130 may include a non-ferrous, non-ferromagnetic, or non-metallic material. Wall 130 may generally be formed of a plastic. Certain embodiments of wall 130 may be formed of any appropriate polyethylene, including, but not limited to, a high density polyethylene.

Figure 4:
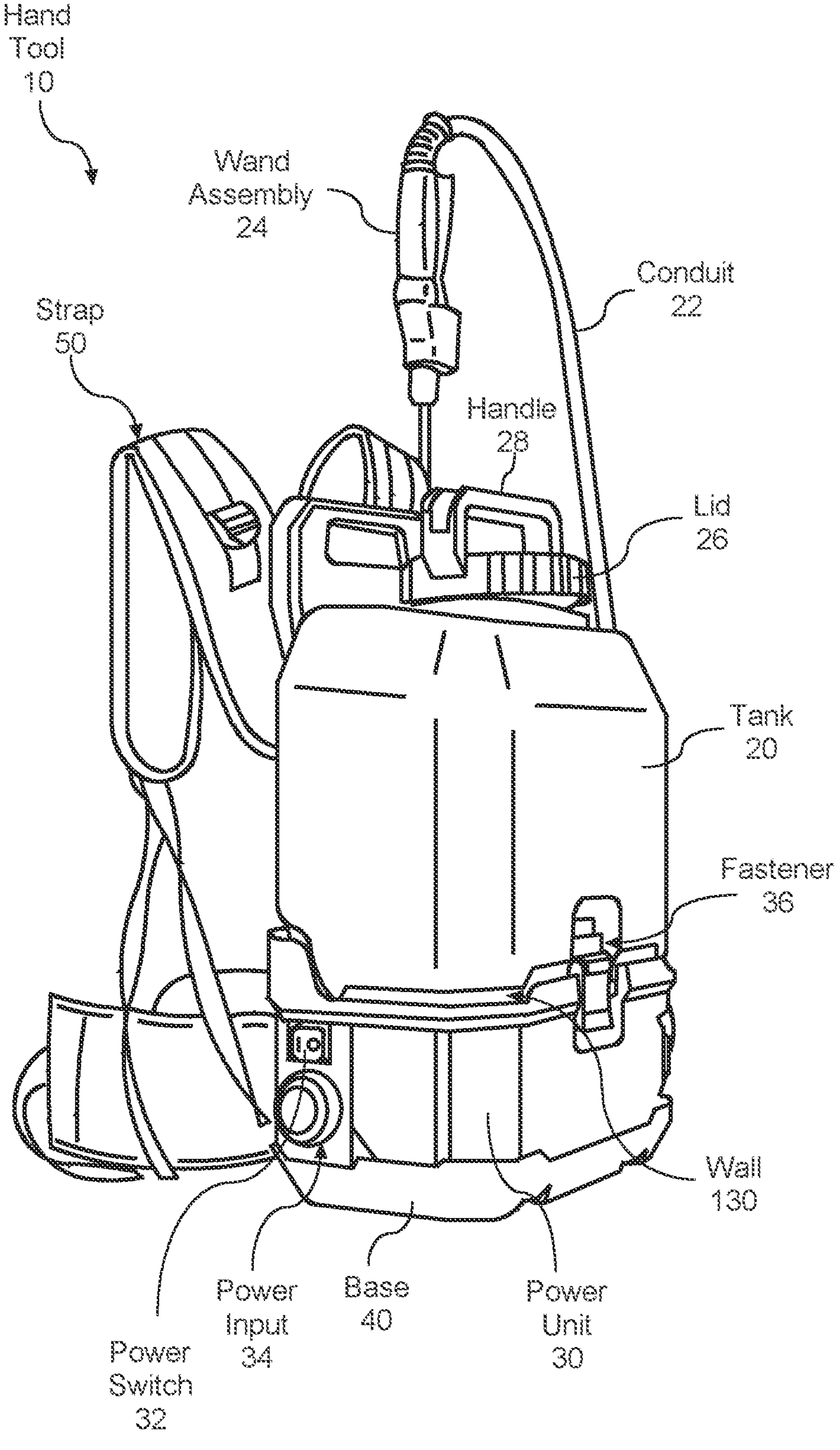
FIG. 4 is a perspective view of an exemplary embodiment of a hand tool at which embodiments of the machine drive system is included in accordance with aspects of the present disclosure.

Referring now to FIG. 4, an exemplary embodiment of a hand tool 10 is provided at which embodiments of system 100 (FIGS. 1-3) may be included. The embodiment of hand tool 10 depicted in FIG. 4 may particularly form a portable power sprayer having a tank 20. In particular embodiments, tank 20 includes at least a portion of wall 130 such as depicted and described herein. Hand tool 10 includes a power unit 30. Second side 132 (FIGS. 1-3) is formed within tank 20. First side 131 (FIGS. 1-3) is formed with power unit 30. In various embodiment, power unit 30 includes drive device 110 such as depicted and described in regard to FIGS. 1-2. In still various embodiments, power unit 30 includes coil 140 such as depicted and described in regard to FIG. 3. In particular embodiments, power unit 30 further includes at least a portion of wall 130. Accordingly, wall 130 may include a double wall structure formed from at least a portion of the tank 20 and the power unit 30. Still further, wall 130 may include two or more separable layers such as corresponding to the power unit 30 and the tank 20.

Various embodiments of power unit 30 may include batteries, capacitors, AC power units, or other electric devices such as to operate the drive device 110 or coil 140 such as described herein. Power unit 30 may include a power switch 32 configured to selectively supply and discontinue power to operate the drive device 110 or coil 140 such as described herein. Power unit 30 may include a power input 34 configured to receive a charge cable or power cord, such as to provide power to the drive device 110, coil 140, or a battery, capacitor, or other electric storage device or drive mechanism.

Hand tool 10 may furthermore include a base 40 upon which power unit 30, tank 20, or both, may be disposed. Strap 50 may be configured in a backpack configuration, messenger-bag configuration, or other appropriate configuration of a retention device to a user, such as to allow a user to carry, handle, or otherwise move the hand tool 10.

Conduit 22 may extend from the outlet opening 126 (FIGS. 1-3), such as to allow for fluid communication of the medium at the second side 132 (FIGS. 1-3) through wand assembly 24. Wand assembly 24 may include any appropriate nozzle, spray device, flow device, extension manifolds, triggers, or grips, as may be appropriate for dispensing a solid, liquid, and/or gaseous medium.

A fastener interface 36 is formed at the tank 20 and power unit 30. The fastener interface 36 may form a clip, retainer, retention device, snap, or other interface configured to selectively attach and detach the tank 20 from the power unit 30. The fastener interface 36 may include a mechanical fastener, such as, but not limited to, a bolt, nut, screw, tie rod, or combinations thereof.

Figure 5:
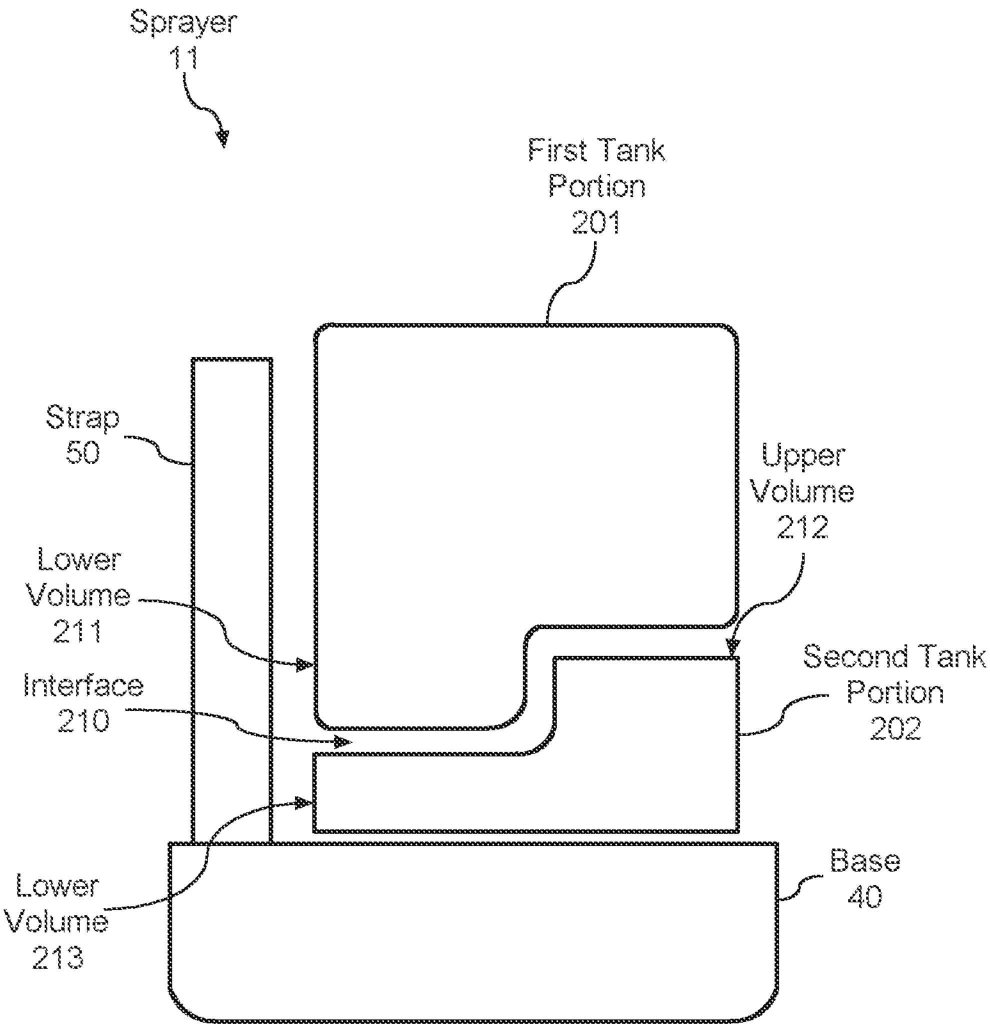
FIG. 5 is a schematic view of an exemplary embodiment of a portable sprayer in accordance with aspects of the present disclosure.

Referring now to FIG. 5, a schematic view of an exemplary embodiment of a hand tool configured as a portable sprayer 11. Embodiments of the sprayer 11 may be configured as the hand tool 10 such as provided in FIG. 4. The schematic view provided in FIG. 5 is partially exploded to more clearly depict contours and interfaces between various components. Embodiments of the sprayer 11 form the tank 20 having a first tank portion 201 selectively separable from a second tank portion 202. The first tank portion 201 forms a walled enclosure configured to retain or contain a medium, such as a solid, gas, or liquid fluid, or combinations thereof, such as described herein. The second tank portion 202 forms a walled enclosure configured to retain or contain the medium, such as described herein. The second tank portion 202 is configured to receive the first tank portion 201. First and second tank portions 201, 202 may be form-fitted to one another, such as to include a lower volume portion at one tank portion and corresponding upper volume portion at another tank portion.

Figure 6:
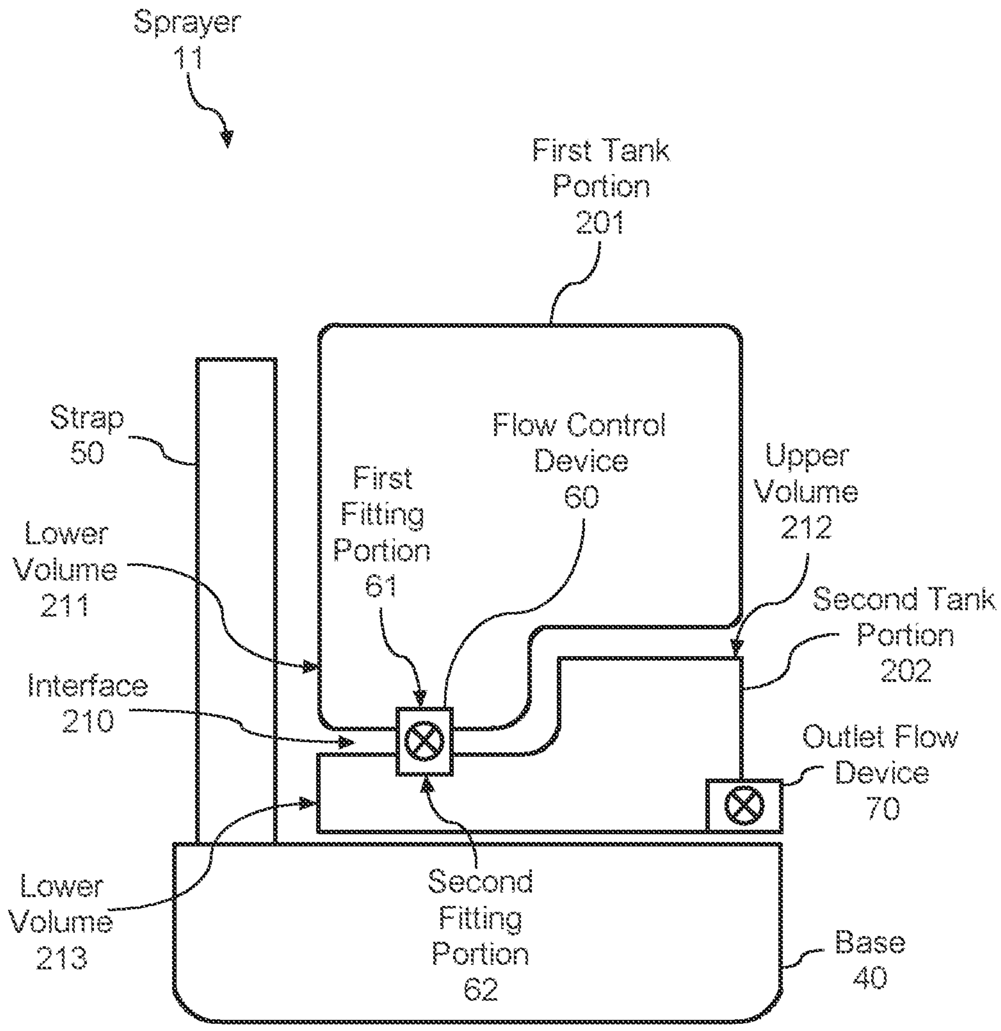
FIG. 6 is a schematic view of an exemplary embodiment of a portable sprayer in accordance with aspects of the present disclosure.

Referring now to FIG. 6, a schematic view of an exemplary embodiment of a portable sprayer 11 is provided. Embodiments depicted in FIG. 6 may be configured substantially such as provided in regard to FIG. 5. In particular embodiments, a flow control device 60 is positioned at an interface 210 of the first tank portion 201 and the second tank portion 202. The flow control device 60 may particularly form a quick connect or quick disconnect fitting. In certain embodiments, the first tank portion 201 includes a first fitting portion 61 and the second tank portion 202 includes a second fitting portion 62. In various embodiments, the first fitting portion 61 or the second fitting portion 62 may include a male connector and the other of the second fitting portion 62 or the first fitting portion 61 may include a female connector.

In various embodiments, the first tank portion 201 and the second tank portion 202 are each contoured such as to have adjacent exterior surfaces to one another when connected together at the interface 210. In a particular embodiment, the second tank portion 202 includes an upper volume 212 extending greater in height (e.g., extending greater in vertical dimension from the power unit 30) than a lower volume 211 at the first tank portion 201. In a still particular embodiment, interface 210 is positioned at the lower volume 211 at the first tank portion 201 and at a lower volume 213 at the second tank portion 202.

In particular embodiments, an outlet flow control device 70 is positioned at the second tank portion 202. The outlet flow control device 70 may include any appropriate fitting, connection, opening, valve, or other device at which the conduit 22 may connect to provide fluid communication from the second tank portion 202 to the wand assembly 24.

Embodiments of the sprayer 11 provided herein allow a user to re-fill the tank 20, such as by detaching the first tank portion 201 from the second tank portion 202 and re-attaching the portions 201, 202 at the flow control device 60. In an exemplary operating mode, a user attaches the first tank portion 201 including a medium. The flow control device 60 receives the medium from the first tank portion 201 and allows for flow into the second tank portion 202. The height of the first tank portion 201 and the upper volume 212 at the second tank portion 202 allows for the second tank portion 202 to be filled. The user desirably ejects the medium, such as via the wand assembly 24 fluidly connected to the second tank portion 202. As the medium is expelled from the outlet flow control device 70, the medium at the first tank portion 201 flows into the second tank portion 202 through the flow control device 60. The upper and lower volumes at the tank portions 201, 202 may allow the first tank portion 201 to be substantially empty of the medium prior to the second tank portion 202 being substantially empty of the medium. Accordingly, the user may continue to use the sprayer 11 and apply, flow, spray, or otherwise expel the medium from the second tank portion 202.

The user may detach the first tank portion 201 and re-fill with the medium. Additionally, or alternatively, the user may attach another first tank portion 201 containing the medium. Accordingly, the user may expel medium without interruption. Particularly, the user may expel medium through the wand assembly or other flow device without flow disruption, or without requiring a substantial interruption in work by the user, by replacing the medium at the first tank portion 201 without running out of medium at the sprayer 11, such as via the medium at the second tank portion 202.

Figure 7:
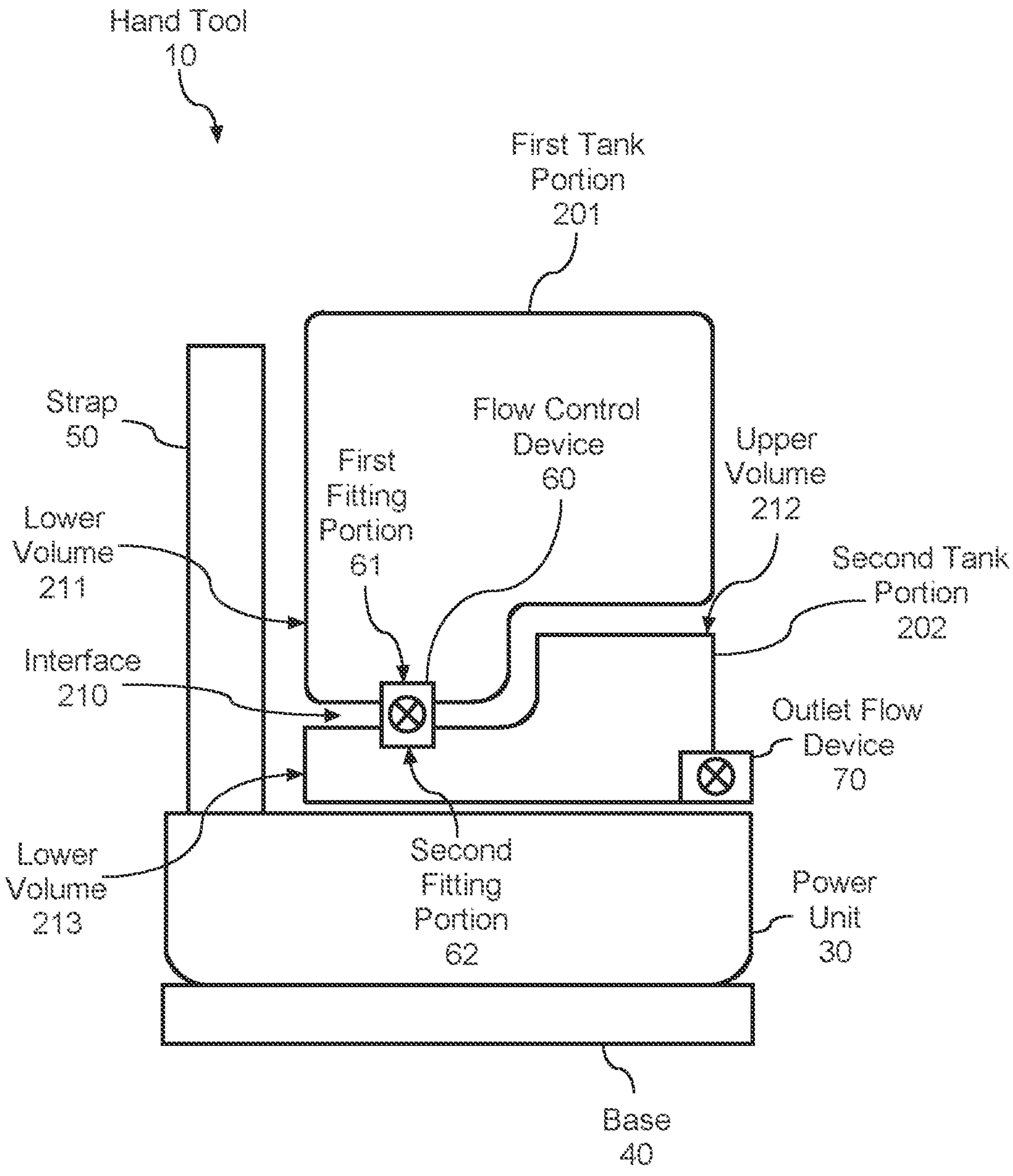
FIG. 7 is a schematic view of an exemplary embodiment of a portable sprayer in accordance with aspects of the present disclosure.

Referring now to FIG. 7, an embodiment of the hand tool 10 may include the system 100 such as described in regard to FIGS. 1-4 and the sprayer such as described in regard to FIG. 5-6. In such embodiments, wall 130 such as described in regard to FIGS. 1-3 may be formed at the second tank portion 202. Accordingly, second side 132 may be formed within the volume formed at the second tank portion 202. As such, embodiments of the machine drive device 120, receiver device 122, or coil 140 may be formed within the second tank portion 202. Second tank portion 202 is positioned in electromagnetically proximate arrangement with the power unit 30. In certain embodiments, second tank portion 202 is directly adjacent to the power unit 30. In a still particular embodiment, the second tank portion 202 is vertically stacked atop the power unit 30.

Referring to FIGS. 1-7, wall 130 may refer to portions of both the tank 20, or in particular embodiments the second tank portion 202, and the power unit 30. As such, wall 130 may be a double-wall structure in which the tank 20, or particularly the second tank portion 202, is separable from the power unit 30.

Referring still to FIGS. 1-7, in one embodiment, outlet opening 126 (FIGS. 1-3) is positioned within the second tank portion 202. Inlet opening 124 may be positioned within the second tank portion 201, such as to receive medium within the second tank portion 202 and emit from the outlet opening 126 as a pressurized flow via the machine drive device 120. In an embodiment, the outlet opening 126 (FIGS. 1-3) and the outlet flow control device 70 (FIG. 7) are together an integral structure. In another embodiment, a conduit (not shown), such as a hose, tube, or other appropriate flexible or rigid manifold, may connect the outlet opening 126 to the outlet flow control device 70 (FIG. 7).

Referring to FIGS. 1-7, embodiments of the hand tool 10 configured as the sprayer 11 and system 100 provided herein may allow for cleaning of components at the machine drive device 120, inlet opening 124, outlet opening 126, wall 130, second tank portion 202, or interior volumes thereof via connection of a water supply or cleaning solution to the second fitting portion 62 and flowing cleaning fluid through the second side 132 and egress through the outlet flow control device 70. Accordingly, a single second tank portion 202 may be utilized within a plurality of first tank portions 201 each containing a different medium. Alternatively, or additionally, the tank 20 including the first and second tank portions 201, 202 may be separable via fasteners or quick-release fittings, such as to allow other first and second tank portions 201, 202 having mutually similar mediums to be utilized.

Still various embodiments may include a lid 26 at the tank 20, or particularly the first tank portion 201, such as may be selectively opened and closed and allow a medium to be provided within the first tank portion 201. Lid 26 may include a handle 28 configured to allow a user to grab, e.g., with a single hand, the lid 26, or furthermore, the first tank portion 201, or furthermore, the second tank portion 202 fastened to the first tank portion 201, e.g., via fastener 36. Handle 28 may furthermore allow a user to grab the entire hand tool assembly. It should be appreciated that base 40, power unit 30, tank 20, strap 50, and other components depicted and described herein may, in various portions, be selectively attachable and detachable to one another. Still further embodiments may include separable interfaces at respective components. For instance, power unit 30, tank 20, or second tank portion 202 may include flanges and seals that may be integrated to one another as non-detachable assemblies or non-reattachable assemblies, or as selectively separable flanges and seals.

Further aspects and embodiments of the present subject matter are provided in the following clauses:

1. A machine drive system, the machine drive system including a wall forming a first side fluidly separated from a second side; a machine drive device disposed at the second side, the machine drive device including a receiver device, wherein a second gap is formed between the receiver device and the wall at the second side; a drive device positioned at the first side in electromagnetically proximate arrangement to the machine drive device, wherein a first gap is formed between at least a portion of the drive device and the wall.
2. The machine drive system of any clause herein, the drive device including a driver device.
3. The machine drive system of any clause herein, wherein the driver device is positioned in electromagnetically magnetically proximate arrangement to the receiver device, and wherein the first gap is formed between the driver device and the wall.
4. The machine drive system of any clause herein, wherein the driver device includes a first magnet, and wherein the receiver device includes a second magnet having an opposite polarity to the first magnet.
5. The machine drive system of any clause herein, wherein the driver device includes a magnet, and wherein the receiver device includes a ferrous material.
6. The machine drive system of any clause herein, wherein the wall includes a polyethylene material.
7. The machine drive system of any clause herein, wherein the machine drive device includes a coil positioned at the second side and operably coupled to the receiver device to flow current to the receiver device.
8. The machine drive system of any clause herein, wherein the coil is positioned in electromagnetically proximate arrangement to the driver device.
9. The machine drive system of any clause herein, wherein the machine drive device includes a coil positioned at the first side, wherein the coil is positioned in electromagnetically proximate arrangement to the receiver device.
10. The machine drive system of any clause herein, wherein the machine drive device forms a pump, a compressor, an impeller, or a nozzle.
11. The machine drive system of any clause herein, the machine drive device including an inlet opening configured to receive a medium and an outlet opening configured to egress the medium from the machine drive device.
12. A hand tool including the machine drive device of any clause herein.
13. A hand tool, including a tank configured to receive a solid, liquid, gaseous, or combination thereof medium, the tank including a first tank portion selectively separable from a second tank portion.

14. A hand tool, including a tank configured to receive a solid, liquid, gaseous, or combination thereof medium, the tank including a first portion of the wall of the machine drive system, wherein the tank forms the second side; a power unit including a second portion of the wall of the machine drive system, wherein the power unit forms the first side; and the machine drive system of any clause herein.

15. The hand tool of any clause herein, wherein the wall is a double wall structure formed from the tank and the power unit.

16. The hand tool of any clause herein, wherein the tank includes a first tank portion selectively separable from a second tank portion.

17. The hand tool of any clause herein, wherein the second side is formed at the second tank portion.

18. The hand tool of any clause herein, wherein the tank includes a flow control device formed at the first tank portion and the second tank.

19. The hand tool of any clause herein, wherein the flow control device includes a first fitting portion at the first tank portion, and wherein the flow control device includes a second fitting portion at the second tank portion.

20. The hand tool of any clause herein, wherein the flow control device is positioned at a lower volume of each respective first tank portion and second tank portion.

21. The hand tool of any clause herein, the second tank portion including an outlet flow control device.

22. The hand tool of any clause herein, the hand tool including a conduit fluidly coupled to the outlet flow control device and configured to flow the medium through the conduit.

23. The hand tool of any clause herein, wherein the hand tool is a sprayer device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A hand tool, comprising:

a machine drive system comprising:

a wall forming a first side fluidly separated from a second side;

a machine drive device disposed at the second side, the machine drive device comprising a receiver device, wherein a second gap is formed between the receiver device and the wall at the second side;

a drive device positioned at the first side in electromagnetically proximate arrangement to the machine drive device, wherein a first gap is formed between at least a portion of the drive device and the wall; and a power unit comprising a second portion of the wall of the machine drive system, wherein the power unit forms the first side of the machine drive system;

a tank configured to receive a solid, liquid, or gaseous medium, or combination thereof, the tank comprising a first portion of the wall of the machine drive system, wherein the tank forms the second side of the machine drive system, wherein the tank comprises a first tank portion selectively separable from a second tank portion, the tank comprising a flow control device positioned at a lower volume of each respective first tank portion and second tank portion.

2. The hand tool of claim 1, wherein the wall is a double wall structure formed from the tank and the power unit.

3. The hand tool of claim 1, wherein the second side is formed at the second tank portion.

4. The hand tool of claim 1, wherein the flow control device comprises a first fitting portion at the first tank portion, and wherein the flow control device comprises a second fitting portion at the second tank portion.

5. The hand tool of claim 1, the second tank portion comprising an outlet flow device.

6. The hand tool of claim 5, wherein the hand tool comprises a sprayer device comprising a conduit fluidly coupled to the outlet flow device and configured to flow the medium through the conduit.

7. The hand tool of claim 1, wherein the drive device of the machine drive system comprises a driver device positioned in electromagnetically proximate arrangement to the receiver device, and wherein the first gap is formed between the driver device and the wall.

8. The hand tool of claim 1, wherein the drive device of the machine drive system comprises a driver device comprising a first magnet, and wherein the receiver device comprises a ferrous material or a second magnet having an opposite polarity to the first magnet.

9. The hand tool of claim 1, wherein the wall forming the first side fluidly separated from the second side comprises a polyethylene material.

10. The hand tool of claim 1, wherein the machine drive device comprises a coil positioned at the second side and configured to flow current to the receiver device.

11. The hand tool of claim 10, wherein the drive device of the machine drive system comprises a driver device, and wherein the coil is positioned in electromagnetically proximate arrangement to the driver device.

12. The hand tool of claim 1, wherein the machine drive device comprises a pump, a compressor, an impeller, or a nozzle.

13. The hand tool of claim 1, wherein the machine drive device comprises an inlet opening configured to receive the medium, and wherein the machine drive device comprises an outlet opening configured to egress the medium from the machine drive device.

* * * * *